United States Patent [19]

Seki

[11] Patent Number: 5,355,298
[45] Date of Patent: Oct. 11, 1994

[54] CONVERSION APPARATUS INCLUDING LATCH AND NON-LATCH TYPE FUNCTIONS

[75] Inventor: Nagataka Seki, Tokyo, Japan

[73] Assignee: Kabushiki Kaisha Toshiba, Kawasaki, Japan

[21] Appl. No.: 99,326

[22] Filed: Jul. 30, 1993

[30] Foreign Application Priority Data

Mar. 16, 1993 [JP] Japan ................ 5-056180

[51] Int. Cl.⁵ ............................. H02H 7/122
[52] U.S. Cl. .......................... 363/58; 363/17; 363/136
[58] Field of Search ............ 363/50, 54, 136, 57, 363/58, 17, 98

[56] References Cited

U.S. PATENT DOCUMENTS

| | | | |
|---|---|---|---|
| 3,495,149 | 2/1970 | Swain | 363/136 |
| 3,500,170 | 3/1970 | Charrin et al. | 363/136 |
| 4,086,621 | 4/1978 | Vukasvic | 363/37 |
| 4,376,296 | 3/1983 | Bhagwat et al. | 363/138 |
| 4,670,830 | 6/1987 | Peppel | 363/57 |
| 5,150,287 | 9/1992 | Gruning | 363/135 |
| 5,175,676 | 12/1992 | Kikuchi | 363/58 |

*Primary Examiner*—Steven L. Stephan
*Assistant Examiner*—Adolf Berhane
*Attorney, Agent, or Firm*—Oblon, Spivak, McClelland, Maier & Neustadt

[57] ABSTRACT

A conversion apparatus including a plurality of high-speed switching devices, each being operable in latch type operation and non-latch type operation and a power source for supplying a first current to the high-speed switching devices, thereby forming a current path of the high-speed switching devices. The high-speed switching device is turned off after changeover from the latch type operation to the non-latch type operation. The conversion apparatus further includes a current regulation circuit provided in the current path for regulating a second current flowing through the current regulation circuit after the second current has reached a prescribed value. In case of overcurrent malfunction, the high-speed switching device is changed from the latch type operation to the non-latch type operation, and then is caused to be turned off while the current regulation circuit regulates the second current.

17 Claims, 4 Drawing Sheets

CONVERSION APPARATUS INCLUDING LATCH AND NON-LATCH TYPE FUNCTIONS

BACKGROUND OF THE INVENTION

1. Field of the Invention

The present invention relates to a conversion apparatus which uses high-speed switching devices (abbreviated below as HSDs) possessing two functions, latch type and non-latch type functions.

2. Description of the Related Art

Power devices conventionally used in conversion apparatus for converting DC power to AC power, AC power to DC power, AC power to AC power with a different frequency or DC power to DC power with a different voltage include GTO thyristors (called GTOs below) and transistors. A GTO is a latch type device, which means that once the GTO is brought to an ON state by supplying a signal to its gate, anode current continues to flow even if the gate signal is made "0".

A transistor, on the other hand, conducts when a base signal is supplied but the collector current becomes "0" when the base signal is removed. A device such as this will be called a non-latch type device here.

GTOs are widely used as high-voltage, high-current semiconductor devices whose turn-on voltage is comparatively low. But since current filamentation occurs when they are switched OFF, their breakdown withstand capability is low and large snubber circuits are necessary. Also, their switching speed is not fast.

In contrast, an insulated gate bipolar transistor (called IGBT below) is not liable to break down, since there is no current filamentation, and its switching speed is fast, but it is not suitable for high-voltage applications. Progress has been made in the development of devices with fast switching speeds at high voltage, and one candidate is a device for which the concept is that when the device is in an ON state its structure is made into a latch type so as to reduce conduction losses and immediately before turn-off the device structure is changed over to a non-latch type so as to avoid current filamentation. A specific example is the device shown in Japanese Laid-open Patent Application No. 64-758.

An example of a typical conventional conversion apparatus using the latch type GTOs is shown in FIG. 8. In the figure, 1 is a DC power source, 2P and 2N are DC circuit breakers, 3 is a DC reactor, 4 is a DC capacitor, 5 is a reactor, 6 is a diode, 7 and 8 are DC buses, 11, 12, 13, 14, 15 and 16 are GTOs, 17, 18, 19, 20, 21 and 22 are feedback diodes and 25U, 25V and 25W are AC circuit breakers. This circuit is widely used and is well-known as an inverter and, although not shown, snubber circuits and gate circuits, etc. are needed, but a description of the operation of this circuit will be omitted here.

If, through incorrect operation, GTOs 11 and 12 are ON simultaneously, DC buses 7 and 8 are short-circuited, and so first the charge of DC capacitor 4 goes through reactor 5 into GTOs 11 and 12 and then current from DC power source 1 goes via DC reactor 3 and DC reactor 5 into GTOs 11 and 12.

Overcurrent protection of the devices in a circuit such as this is provided by including elements, usually reactors or fuses, which restrict the magnitude of current to values below the surge current withstand capability that can be withstood by the devices themselves. In, for example, the case of a GTO with which the turn-off current is 1000 A, the surge current withstand capability is 7000 A in the case of a sinusoidal half wave with a width of 10 ms. In FIG. 8, reactor 5 keeps short-circuit current to a value that is below the surge current withstand capability of GTOs 11 and 12, etc. and DC reactor 3 suppresses inflow of current from the DC power source 1 in the time up to when DC circuit breakers 2 are opened. Reactor 5 must be so designed that it does not become saturated by excessive current flowing in during this period. DC reactor 3 must be an element that is not saturated by the voltage-time product to which it is subjected during the short circuit period. Consequently, they are both made as large reactors. AC circuit breakers 25U, 25V and 25W shall be opened immediately when there is inflow of current from loads not shown or when fault circuits and loads are to be isolated.

On the other hand, if non-latch type devices, i.e., transistors, are used in the circuit of FIG. 8, since the devices themselves can act to suppress overcurrent through the device, the overcurrent can be stopped immediately by applying reverse bias to their bases if a short circuit occurs. Reactor 5 is not absolutely necessary but since it acts to suppress current if it is present, it allows a time delay up to the time of protective action following a short circuit. Since the current at the time of a short circuit is at most about double that of normal operation, even if reactor 5 is included it need only be a small reactor.

In conversion apparatus using HSDs which have been developed to provide conversion apparatuses which have the both advantages of using latch type devices and non-latch type devices, the respective advantages of the devices are displayed in normal operating states. In normal operation, turn-off action is performed after changeover to a non-latch type immediately before turn-off. But since in a steady ON state the devices are in a latch state, if, because of commutation failure, etc., a DC short circuit occurs and overcurrent flows, it is not possible to change the device state to a non-latch type. Consequently, it is not possible to effect turn-off at bases or gates as with transistors, and the present situation is that increases in current are suppressed by using large reactors as in the case when thyristors or GTOs are used.

SUMMARY OF THE INVENTION

Accordingly, one object of the present invention is to provide a conversion apparatus constructed by HSDs with non-latch type and latch type functions which can protect the HSDs properly against overcurrent in latch states without using large reactors.

These and other objects of this invention can be achieved by a conversion apparatus including a plurality of high-speed switching devices, each being operable in latch type operation and non-latch type operation and a power source for supplying a first current to the high-speed switching devices, thereby forming a current path through the high-speed switching devices. The high-speed switching device is turned off upon changeover from the latch type operation to the non-latch type operation. The conversion apparatus further includes a current regulation circuit provided in the current path for regulating a second current flowing through the current regulation circuit after when the second current has reached a prescribed value. In case of overcurrent malfunction, the high-speed switching device is changed from the latch type operation to the non-latch type operation, and then is caused to be turned off while the current regulation circuit regulates the second current.

According to one aspect of this invention, there is provided a conversion apparatus including a plurality of high-speed switching devices, each being operable in a latch type operation and non-latch type operation and a power source for supplying a first current to the high-speed switching devices through a circuit breaker. The high-speed switching device is turned off after changeover from the latch type operation to the non-latch type operation. The conversion apparatus further includes a control circuit for halting turn off of the high-speed switching devices when a second current flowing through the high-speed switching device reaches a prescribed value at which the high-speed switching devices cannot be changed to the non-latch type operation, for turning on all of the high-speed switching devices and interrupting the circuit breaker. The high-speed switching device according to the invention is thereby protected in case of overcurrent malfunction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
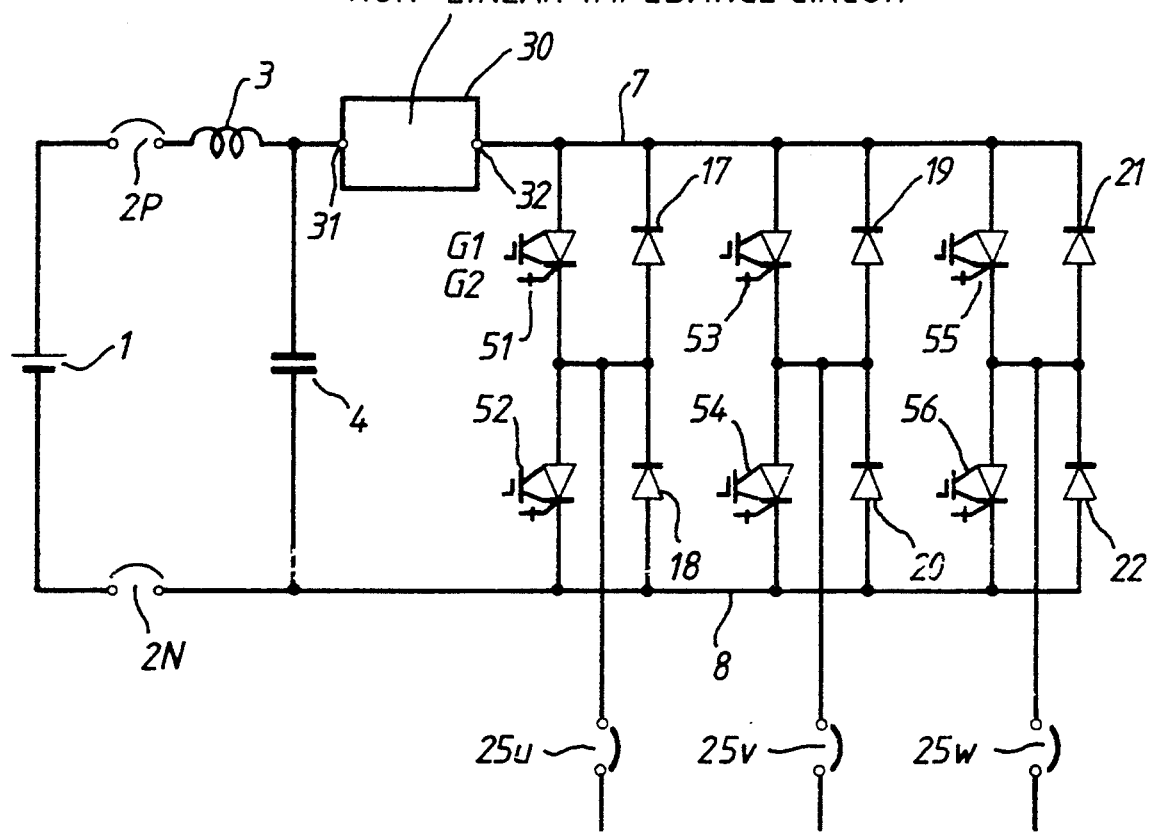
FIG. 1 is a circuit diagram showing a conversion apparatus according to an embodiment of this invention.

Referring now to the drawings, wherein like reference numerals designate identical or corresponding parts throughout the several views, the embodiments of this invention will be described below.

FIG. 1 is a circuit diagram showing one embodiment of the invention. In FIG. 1, 30 is a non-linear impedance circuit that is described later, and 31 and 32 indicate the main terminal portions of this circuit 30. 51 to 56 are HSDs that can change over between latch type and non-latch type functions, and for convenience the symbol used therefor is made a composite symbol of a GTO and a transistor. The way such an HSD is used is that in the ON state a gate selection is made to make it a latch type device and several µs prior to effecting turn-off operation a gate selection is made to make it a non-latch type device. The way gates are selected depends on the structure of the HSD but possible ways are, for example, to effect turn-on by supplying gate signals simultaneously to a gate G1 for non-latch type device and a gate G2 for latch type device and to effect turn-off by turning the gate signal of gate G1 OFF after turning the gate signal of gate G2 OFF or to make sections by means of the levels of voltages that are supplied to the gates G1 and G2. A circuit for generating the above-described gate signals is apparent to those skilled in the art, so that a detailed description of the circuit construction may be omitted.

There is a limit to the anode current at which an HSD can change from a latch type to a non-latch type device. The value of this limit will be designated as I1.

Although there is a difference in procedure that, because of the characteristics of such HSDs, in the circuit of FIG. 1 turn-off is effected after changeover from latch type to non-latch type devices, the normal circuit operation is the same as that of a conventional ordinary inverter. So that, the detailed description of the operation of the conversion apparatus of FIG. 1 may be omitted.

Next, the protective operation when overcurrent occurs because of a short circuit, etc. will be described.

Non-linear impedance circuit 30 displays nearly zero impedance when the current flowing through it is less than a value I2 and displays a larger inductance L when this current is equal to or greater than the value I2 but less than a value I3 (I2<I3<I1). At the value I3 of more, it returns to nearly zero impedance. The value I2 is set at about ½ of the limit value I1.

If now, HSD 52 is turned ON in error while HSD 51 is ON, DC buses 7 and 8 are short-circuited and so the charge of DC capacitor 4 tries to discharge through non-linear impedance circuit 30 and HSDs 51 and 52. Since the impedance of non-linear impedance circuit 30 is nearly zero when the discharge current Ic is less than the value I2, the discharge current Ic rises rapidly. But when the current Ic reaches the value I2, the inductance of non-linear impedance circuit 30 changes to 1, and so the current increase ratio changes to E/L where E is the DC capacitor 30's charging voltage. Since, even at its maximum, the value of the current flowing in HSDs 51 and 52 is I2+(E/L)t, HSDs 51 and 52 and the other HSDs are changed from latch type to non-latch type devices and turned OFF before the value of this current reaches the limit value I1. Here, t is a time measured from the time when Ic=I2.

Figure 2:
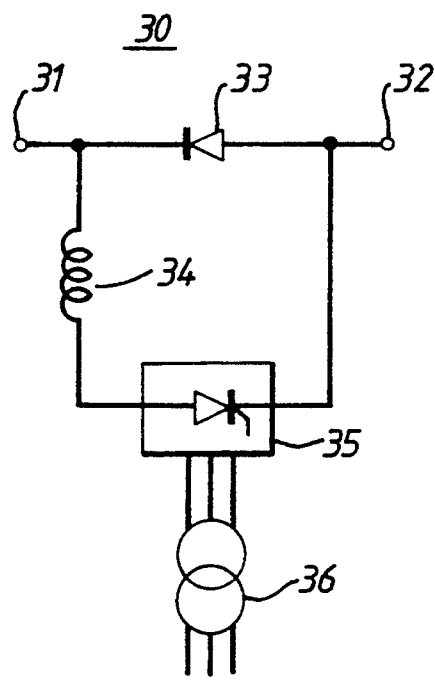
FIG. 2 is a circuit diagram showing one embodiment of a non-linear impedance circuit.

Next, an embodiment of non-linear impedance circuit 30 is shown in FIG. 2. In this Figure, 33 is a high-speed diode, 34 is a reactor, 35 is a rectifier and 36 is a transformer. The primary side of transformer 36 is connected to a power supply not shown. Diode 33 stops current flowing from main terminal 31 to main terminal 32, but it has no ability to block any current that is less than the value I2 if, because of rectifier 35, DC current with the value I2 flows in the series circuit consisting of diode 33 and inductor 34. That is, seen from the exterior, its impedance is zero. However, with a current greater than the value I2, diode 33 becomes reverse-biased and so current flowing in from main terminal portion 31 goes via reactor 34 and rectifier 35 to flow out from main terminal portion 32. During this period, the inductance L of reactor 34 is included in series in this current path. In order that reactor 34 is made small, reactor 34 is saturated and its inductance falls sharply and an impedance that is virtually zero is displayed when a current exceeds the certain value I3. From the point of view of circuit protection, it is satisfactory that there is zero impedance for current going from main terminal 32 to main terminal 31.

Figure 3:
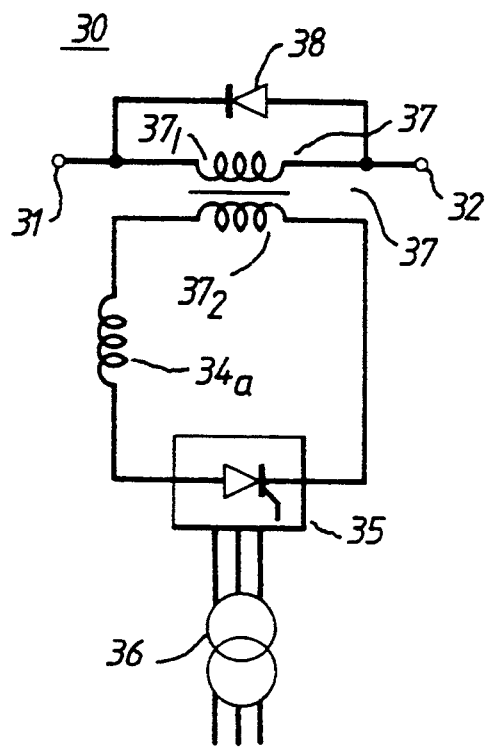
FIG. 3 is a circuit diagram showing another embodiment of a non-linear impedance circuit.

FIG. 3 shows another embodiment of non-linear impedance circuit 30. A saturable reactor 37 and a diode 38 are used in place of diode 33. Saturable reactor 37 is provided with a primary winding 371 and a secondary winding 372. The turn ratio of primary winding 371 to secondary winding 372 is 1 to n. Since DC current with the value I2' flows in the secondary winding 372 of saturable inductor 37, saturable reactor 37 is saturated and the impedance between main terminals 31 and 32 is virtually zero. When the current flowing from main terminal 31 to main terminal 32 reaches the value I2 (=n. I2'), saturable reactor 37 goes to an unsaturated state and displays the characteristic of a reactor with an inductance L. A reactor 34a is inserted in the circuit in a manner such that the value of its current does not change much because of voltage that is produced when saturable reactor 37 is unsaturated. Diode 38 is not absolutely essential, but it acts to absorb the voltage produced by the extremely small inductance that is displayed when saturable reactor 37 is saturated and to reduce the switching surge voltage that is imposed on HSDs 51–56 and feedback diodes 17–22.

Figure 4:
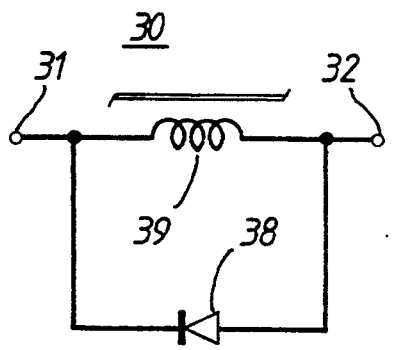
FIG. 4 is a circuit diagram showing yet another embodiment of a non-linear impedance circuit.

FIG. 4 shows a further embodiment of non-linear impedance circuit 30. Reactor 39 is a special reactor in which a permanent magnet is embedded. Because of the permanent magnet, the reactor's inductance is virtually zero when the current flowing in its coil is less than the value I2, but becomes L when the current reaches the value I2. It is satisfactory that reactor 39 is small enough not to become saturated in the period of several tens of μs during which a short circuit is detected and the HSDs are changed from latch type to non-latch type devices and a turn-off operation is performed. The role of diode 38 is the same as in FIG. 3.

Figure 5:
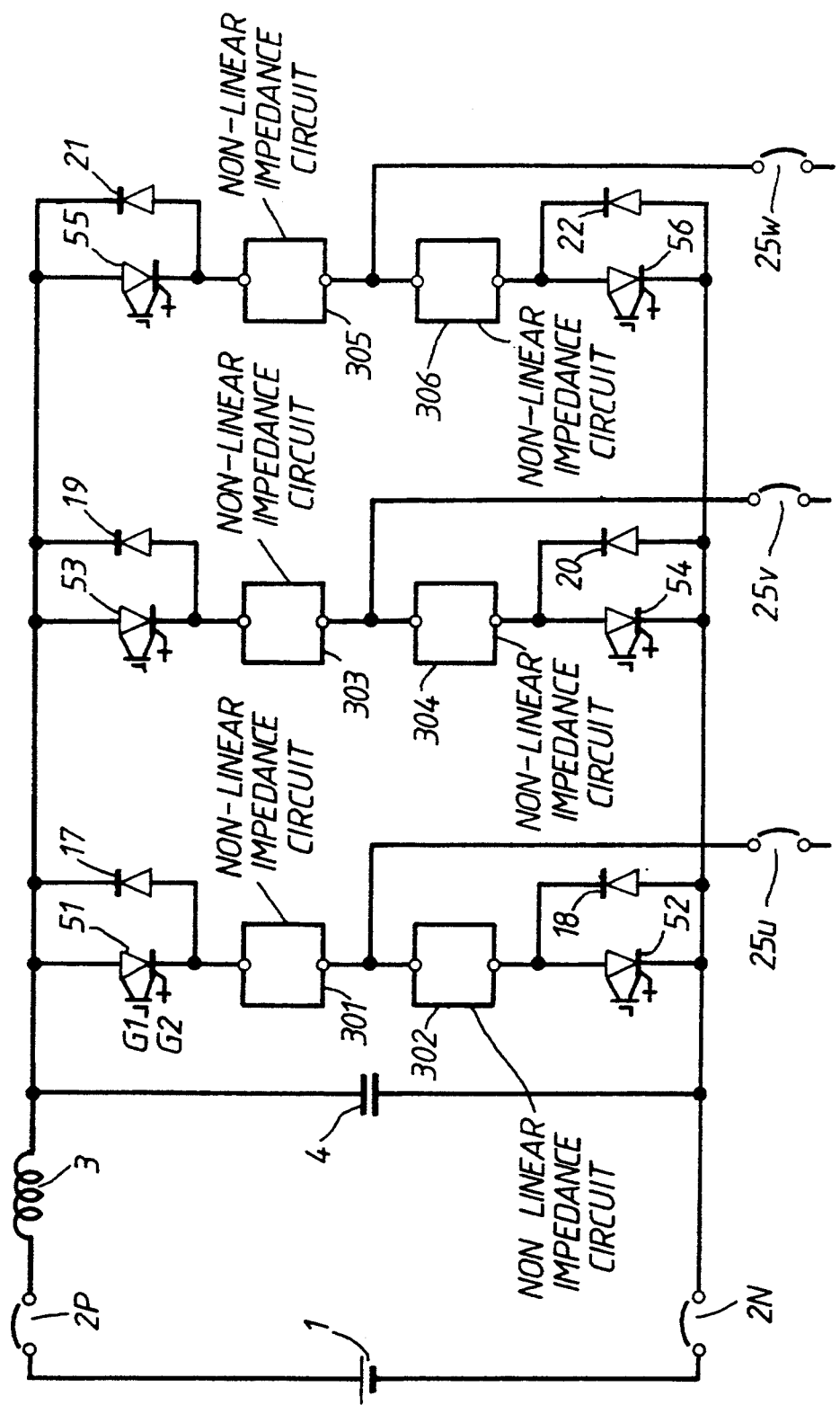
FIG. 5 is a circuit diagram showing a conversion apparatus according to another embodiment of this invention.
Figure 8:
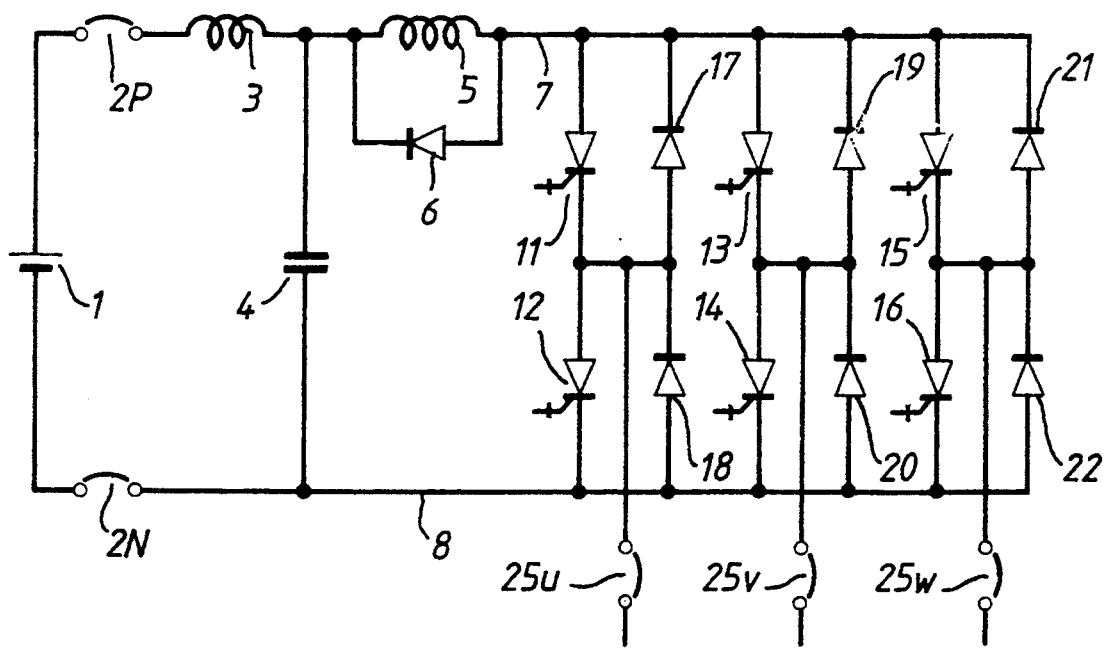
FIG. 8 is a circuit diagram showing an example of a conventional conversion apparatus.

FIG. 5 is a circuit of a conversion apparatus in which non-linear impedance circuits 301–306 are included individually for respective HSDs 51–56. In the 3-phase circuit shown in FIG. 1, the value I2 must be made lower than the limit current value I1 of the HSD. The reason for this is that in the HSDs there is superimposition of the current flowing from the non-linear impedance circuit 30 on the current flowing back through the load, the HSDs and feedback diodes. In contrast to this, when non-linear impedance circuits 301–306 are provided individually for respective HSDs 51–56 as in FIG. 5, the current that flows in each of the HSDs 51–56 and the current flowing in each of the non-linear impedance circuits 301–306 is the same, so that the use up to the limit current I1 of each of the HSDs 51–56 is possible.

The description above was given taking the example of non-linear impedance circuit 30 as an element or circuit possessing a current-limiting function for suppressing the current increase ratio as from the time when current flowing through HSDs 51–56 exceeds a set value. But, it is also, possible to use an element or circuit that possesses a function for increasing the impedance and restricting current from exceeding a set value or reducing the current to below a set value as from the time when current flowing through HSDs exceeds the set value.

Figure 6:
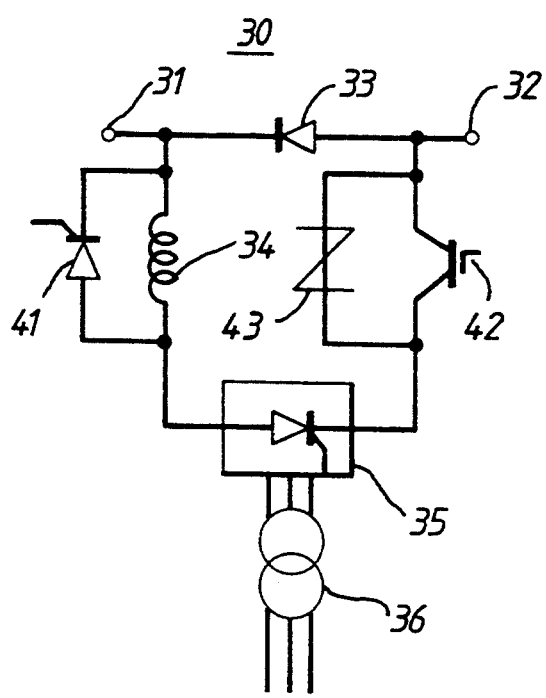
FIG. 6 is a circuit diagram showing another embodiment of a non-linear impedance circuit.
Figure 7:
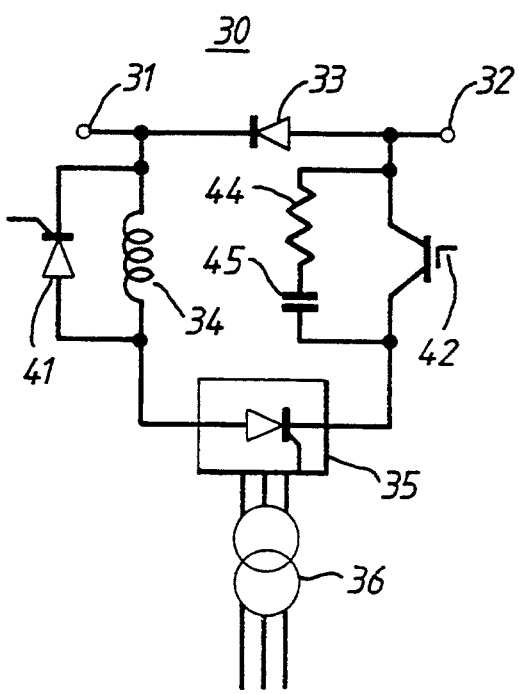
FIG. 7 is a circuit diagram showing still another embodiment of a non-linear impedance circuit.

Such an embodiment of non-linear impedance circuit 30 is shown in FIGS. 6 and 7. Parts Which are the same as in FIG. 2 are given the same number and a description thereof is omitted.

In FIG. 6, 41 is a thyristor, 42 is an IGBT and 43 is a non-linear resistor. Usually this circuit is used with thyristor 41 off and IGBT 42 on, so that it functions the same way as in FIG. 2. When a current flowing from terminal 31 is greater than the value I2, diode 33 becomes reverse-biased. At this time, IGBT 42 is turned off and the thyristor 41 is turned on. In the case that a thyristor rectifier is used as rectifier 35, it is better to delay the phase of triggering thyristors. If thyristor 41 keeps off state, the energy stored in reactor 34 heats non-linear resistor 43 in vain. Thyristor 41 is not necessarily provided if non-linear resistor 43 has much heat margin. Non-linear resistor 43 is used for overvoltage protection of IGBT 42. Instead of non-linear resistor 43, a resistor, a series circuit of a resistor 44 and a capacitor 45 shown in FIG. 7 or another circuit may be used as far as it can protect IGBT 42.

In the case that IGBT 42 is turned off, a path from terminal 31 to terminal 32 through reactor 34, rectifier 35 and IGBT 42 is opened. As a result, the impedance between terminals 31 and 32 is a resistance of non-linear resistor 43 or the resistor provided instead of it, with the result that the short-circuit current is suppressed.

Specifically, non-linear impedance circuit 30 shown in FIG. 6 has a function for increasing the impedance and restricting current from exceeding a set value as from the time when current flowing through HSDs exceeds the set value. In the case where a resistor is used instead of non-linear resistor 43, non-linear impedance circuit 30 has almost the same function as described above.

Non-linear impedance circuit 30 shown in FIG. 7 has a function for increasing the impedance and reducing the current to below a set value as from the time when current flowing through HSDs exceeds the set value.

Further, although a self-commutated 3-phase inverter was used as the conversion apparatus, it is clear that in this invention the number of phases of the conversion apparatus and the conversion apparatus type are not limited to these. Although in the conversion apparatus of FIG. 1 and FIG. 5 the overcurrent of short circuits, etc. is detected by the method of detecting current in ordinary current transformers, it can also be detected by detecting the voltage produced in the non-linear impedance circuits.

In order that the non-linear impedance circuits are made to be small, they display high impedance at a certain value of current. So, from the point of view of HSD protection, it is preferable not to supply a turn-off signal to an HSD in a state in which the current has reached a value exceeding the level of this certain value.

Further, if a state such as described above occurs when an HSD is in a latch state, it becomes impossible to change the device state to a non-latch type and there is a risk of damage to the HSD.

For this case, a circuit to detect DC short circuit is provided. And, in a control circuit (not shown) of the conversion apparatus, there is provided a circuit to generate signals for turning ON the respective HSD simultaneously based on the detection of the DC short circuit. By this circuit all the HSDs in the conversion apparatus are turned on, the risk of damage can be reduced, since the flow of overcurrent is not concentrated in a specific HSD but becomes divided. Further, surer protection is made possible if division of overcurrent is accompanied by interruption of DC breakers 2P and 2N on the input side of the conversion apparatus and, if required, AC circuit breakers 25U, 25V and 25W.

As described above, according to the invention, the reliability of conversion apparatus can be improved, since sure short-circuit protection of the devices is made possible by constituting the conversion apparatus by high-speed switching devices which perform turn-off operations after changing from latch type to non-latch type. Also, the reactors used for suppressing short-circuit current can be made smaller than in the case where latch type devices are used. Further, the power losses generated in conversion apparatus can be made less than in the case where non-latch type devices are used.

According to the invention there is a further excellent advantage that protection is possible even in cases where it is not possible to change a high-speed switching device's state to a non-latch type. Since if current flowing through a high-speed switching device exceeds a current value at which it is not possible to change the state of the high-speed switching device to a non-latch type, protection is provided by halting the high-speed switching device turn-off operation, turning on all the high-speed devices that constitute the conversion apparatus, so as to cause the overcurrent to be shared by all the high-speed switching devices, and interrupting at least the input-side circuit breakers of the conversion apparatus.

Obviously, numerous modifications and variations of the present invention are possible in light of the above teachings. It is therefore to be understood that within the scope of the appended claims, the invention may be practiced otherwise than as specifically described herein.

What is claimed:

1. A conversion apparatus, comprising:
   a plurality of high-speed switching devices, each being selectively operable by controlling a gate thereof in latch type operation and non-latch type operation;
   power source means for supplying a first current to said high-speed switching devices, thereby forming a current path through said high-speed switching devices;
   said high-speed switching device being turned off after changeover from said latch type operation to said non-latch type operation;
   current regulation means provided in said current path for regulating a second current flowing through said current regulation means after said second current has reached a prescribed value; and
   said high-speed switching device being changed from said latch type operation to said non-latch type operation, and then being caused to be turned off while said current regulation means regulates said second current in case of overcurrent malfunction.

2. The conversion apparatus according to claim 1, wherein:
   said current regulation means regulates said second current such that a current increase ratio of said second current is suppressed after said second current has reached said prescribed value.

3. The conversion apparatus according to claim 2, wherein:
   said current regulation means includes a non-linear impedance circuit which has substantially zero impedance when said second current flowing through said current regulation means is less than said prescribed value and has at least an inductance component when said second current is equal to or greater than said prescribed value.

4. The conversion apparatus according to claim 3:
   wherein said non-linear impedance circuit includes,
   a high-speed diode, and
   a series circuit of a reactor and a rectifier,
   said series circuit being connected in parallel to said high-speed diode, and
   said rectifier flowing a DC current of said prescribed value to said high-speed diode through said reactor; and
   wherein said non-linear impedance circuit is provided in said current path such that said high-speed switching diode is in the reverse direction to said first current.

5. The conversion apparatus according to claim 3:
   wherein said non-linear impedance circuit includes,
   a saturable reactor with a primary winding and a secondary winding,
   a series circuit of a reactor and a rectifier,
   said series circuit being connected in parallel to said secondary winding of said saturable reactor,
   said rectifier flowing a DC current of a predetermined value to said secondary winding through said reactor to saturate said saturable reactor, and
   wherein said non-linear impedance circuit is provided in said current path such that said primary winding is connected in said current path so that said saturable reactor goes into an unsaturated state by said first current.

6. The conversion apparatus according to claim 3:
   wherein said non-linear impedance circuit includes,
   a parallel circuit of a diode and an reactor,
   said reactor including a permanent magnet and a winding,
   said reactor having substantially zero impedance when said second current flowing through said current regulation means is less than said prescribed value and having at least an inductance component when said second current is equal to or greater than said prescribed value; and
   wherein said non-liner impedance circuit is provided in said current path such that said diode is in the reverse direction to said first current.

7. The conversion apparatus according to claim 1, wherein:
   said current regulation means regulates said second current such that said second current does not exceeds said prescribed value as from said time when said second current reaches said prescribed value.

8. The conversion apparatus according to claim 7, wherein:
   said current regulation means includes a non-linear impedance circuit which has substantially zero impedance when said second current flowing through said current regulation means is less than said prescribed-value and has at least a resistance component when said second current is equal to or greater than said prescribed value.

9. The conversion apparatus according to claim 8:
   wherein said non-linear impedance circuit includes,
   a high-speed diode, and
   a series circuit of a reactor, a rectifier and a parallel circuit of a switching device and a resistor,
   said series circuit being connected in parallel to said high-speed diode, and
   said switching device being in an ON state when said second current flowing through said current regulation means is less than said prescribed value and being turned off when said second current is equal to or greater than said prescribed value, said rectifier flowing a DC current of said predetermined value to said high-speed diode through said reactor and said parallel, and wherein said non-linear impedance circuit is provided in said current path such that said high-speed switching diode is in the reverse direction to said first current.

10. The conversion apparatus according to claim 9, wherein:

said switching device includes an insulated gate bipolar transistor; and said resistor includes a non-linear resistor.

11. The conversion apparatus according to claim 1, wherein:

said current regulation means regulates said second current such that said second current is reduced below said prescribed value as from said time when said second current reaches said prescribed value.

12. The conversion apparatus according to claim 11 wherein:

said current regulation means includes a non-linear impedance circuit which has substantially zero impedance when said second current flowing through said current regulation means is less than said prescribed value and has at least a resistance component when said second current is equal to or greater than said prescribed value.

13. The conversion apparatus according to claim 12: wherein said non-linear impedance circuit includes, a high-speed diode, and a first series circuit of a reactor, a rectifier and a parallel circuit of a switching device and a second series circuit of a resistor and a capacitor, said first series circuit being connected in parallel to said high-speed diode, and said switching device being in an ON state when said second current flowing through said current regulation means is less than said prescribed value and being turned off when said second current is equal to or greater than said prescribed value, said rectifier flowing a DC current of said predetermined value to said high-speed diode through said reactor and said parallel circuit, and wherein said non-linear impedance circuit is provided in said current path such that said high-speed switching diode is in the reverse direction to said first current.

14. The conversion apparatus according to claim 13, wherein:

said switching device includes an insulated gate bipolar transistor.

15. The conversion apparatus according to claim 1, wherein:

said high-speed switching devices are connected to form a three-phase bridge connection; and said current regulation means is provided in said current path between said power source means and said three-phase bridge connection.

16. The conversion apparatus according to claim 1, wherein:

said high-speed switching devices are connected to form a three-phase bridge connection; and a plurality of said current regulation means are provided and each of said current regulation means is connected in series to one of said high-speed switching devices, respectively.

17. A conversion apparatus, comprising:

a plurality of high-speed switching devices, each being selectively operable by controlling a gate thereof in latch type operation and non-latch type operation;

power source means for supplying a first current to said high-speed switching devices through a circuit breaker, said high-speed switching device being turned off after changeover from said latch type operation to said non-latch type operation; and control means for halting turn off of said high-speed switching devices when a second current flowing through said high-speed switching devices reaches a prescribed value at which said high-speed switching devices cannot be changed to said non-latch type operation, for turning on all of said high-speed switching devices and interrupting said circuit breaker;

said high-speed switching device being protected in case of overcurrent malfunction.

* * * * *